United States Patent [19]

Valiga et al.

[11] 4,352,601
[45] Oct. 5, 1982

[54] PERMANENT BIN FOR TEMPORARY STORAGE OF HAZARDOUS MATERIALS

[75] Inventors: Richard E. Valiga, Center Square; John R. Rosso, Mechanicsburg, both of Pa.

[73] Assignee: Stabatrol Corporation, Norristown, Pa.

[21] Appl. No.: 178,965

[22] Filed: Aug. 18, 1980

[51] Int. Cl.³ .......................... E02D 3/00; E02B 3/16
[52] U.S. Cl. .................................. 405/270; 52/169.7; 405/54; 405/128
[58] Field of Search ............................... 405/128–130, 405/258, 263, 270, 54, 52; 52/169.7, 169.8

[56] References Cited

U.S. PATENT DOCUMENTS

| | | | |
|---|---|---|---|
| 3,383,863 | 5/1968 | Berry | 405/270 |
| 3,461,673 | 8/1969 | Slover | 405/270 |
| 4,065,924 | 1/1978 | Young | 405/270 |
| 4,171,921 | 10/1979 | Morfeldt | 405/128 |
| 4,194,855 | 3/1980 | Egger | 405/128 |
| 4,222,685 | 9/1980 | Jefferson et al. | 405/270 |

*Primary Examiner*—Dennis L. Taylor
*Attorney, Agent, or Firm*—Harry B. Keck

[57] ABSTRACT

A permanent bin for temporary storage of non-volatile chemical hazardous wastes is provided. An excavation basin is lined with a water-impervious film and a water-impermeable cementitious covering. The bin is formed from perimeter walls which are positioned within the rim of the water-impervious cementitious covering. A liquid collection system is provided to retain any drainage from the system for prompt detection, appropriate analysis and for effective disposal if required.

7 Claims, 3 Drawing Figures

PERMANENT BIN FOR TEMPORARY STORAGE OF HAZARDOUS MATERIALS

BACKGROUND OF THE INVENTION

1. Field of the Invention

This invention relates to a permanent bin for temporary storage of hazardous materials having collection facilities for monitoring the effectiveness of the facility.

2. Description of the Prior Art

The disposal of hazardous chemical waste material presents problems to the handling personnel from the time the wastes are generated until they are encapsulated for permanent storage.

Such hazardous chemical wastes may be stored in individual containers, e.g., barrels, until a sufficient number of containers is available for encapsulation. The expenses of purchasing, filling, maintaining and finally disposing of such containers is appreciable. If the waste generation is gradual, e.g., several hundred pounds daily or several tons daily, the waste material may be accumulated in bulk until a sufficient quantity is assembled to warrant permanent encapsulation. When such waste materials are accumulated in bulk outdoors, there is a possibility of leaching hazardous materials into ground water supplies in the region of the storage sites.

There is a need for an outdoor storage facility which can be serviced by available waste handling equipment under circumstances which preclude loss of objectionable leachates into the surrounding ground water supply.

It is further desirable to provide a monitoring system for establishing the composition of any leakage or leachate which may be generated in the temporary storage facilities.

It is further desirable to provide a liquid collection system for accumulating any leakage or leachate from the bin for effective disposal, if required.

SUMMARY OF THE INVENTION

A permanent bin for temporary storage of hazardous waste materials is provided by forming an excavation basin in the region where the bin is to be established. The excavation basin is cut into the existing ground surface in a region selected for the bin. A trench is cut beneath the surface of the excavation basin from the high side of the basin to the low side of the basin. A continuous water-impervious film is applied over the excavation basin and into the trench. A drainage collection conduit is installed in the lined trench and surrounded by water-permeable filler. Thereupon a water-impermeable cementitious covering is applied above the water-permeable filler. Thereafter a periphery wall is established inside the rim of the excavation basin from natural earth materials existing in the region. The periphery wall has a trapezoidal cross-section including a base which lies upon the upper surface of the rim of said water-impermeable cementitious covering and includes a crest surface which has a width of at least 3 feet. The interior sloping surface of the periphery wall is covered with a water-impervious continuous seal which extends over the adjacent annular region of the water-impermeable cementitious covering. Preferably the water-impervious seal also covers the crest surface of the periphery. The exterior sloping of the periphery wall terminates within the rim of the excavation basin. A loading ramp is constructed from a selected location along the periphery outer sloping wall by arranging naturally occurring materials from the region into a ramp-like structure connecting with the natural grade surface of the region outside the periphery wall.

The excavation basin and trench are provided at a level which is above the high water table level in the region. The drainage collection conduit delivers any drainage outside the periphery wall to a monitoring sump from which periodic drainage samples may be collected and retained. The drainage collection system may include a collection tank for accumulating leakage or leachate from the bin.

DESCRIPTION OF THE PREFERRED EMBODIMENTS

Figure 1:
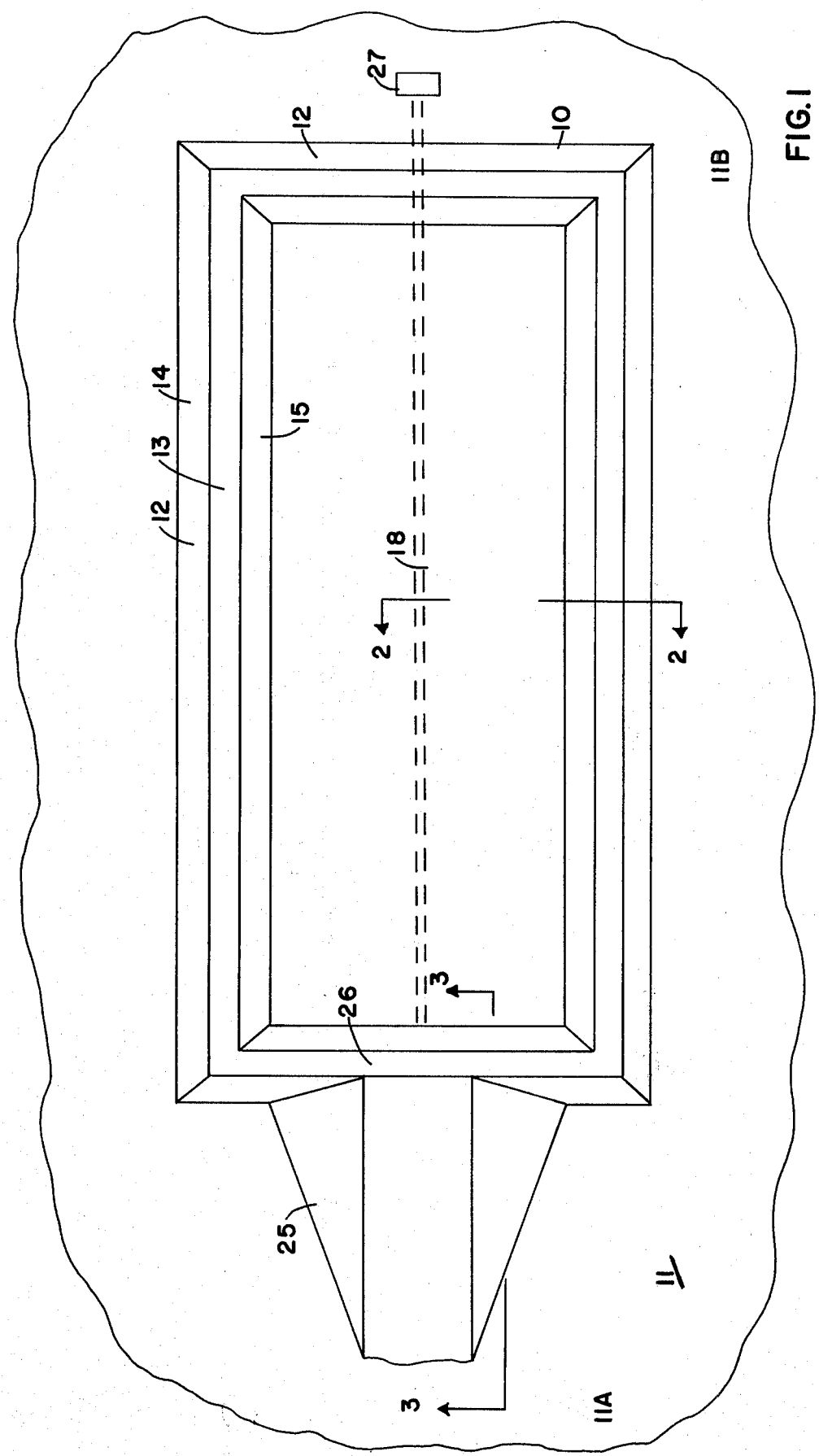
FIG. 1 is a plan view of permanent bin for temporary storage.

The permanent bin 10 is established in a region 11 having a surface grade which proceeds from a high level 11A to a lower level 11B. The bin 10 has periphery walls 12 having a generally trapezoidal cross-section including a crest surface 13, an outer sloping surface 14, an inner sloping surface 15, and a base surface 16.

Figure 2:
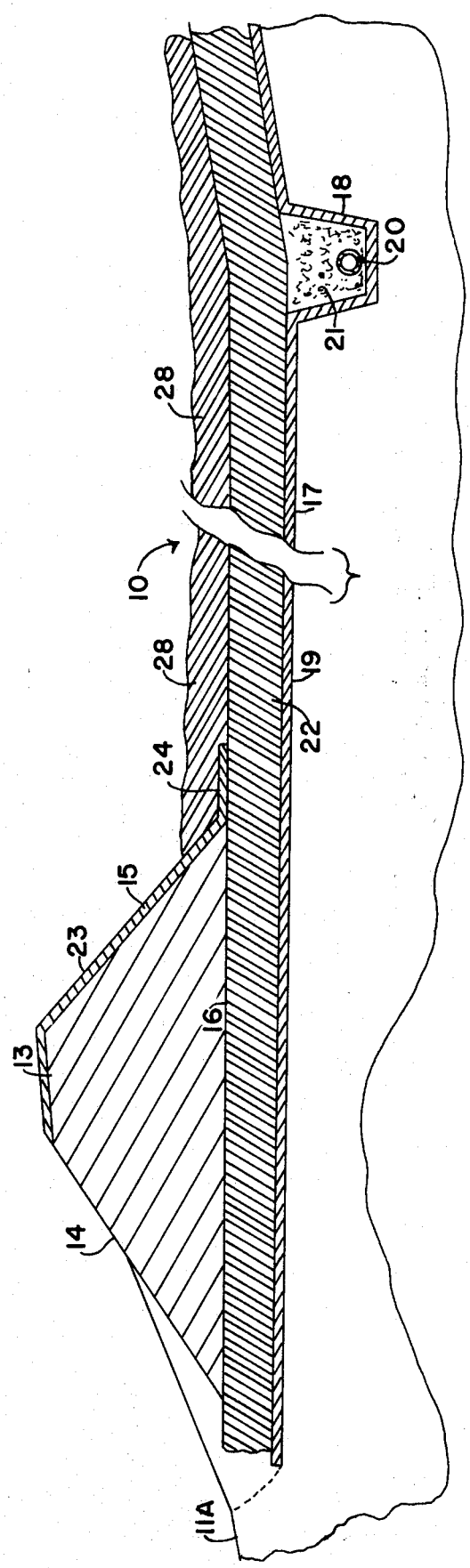
FIG. 2 is a cross-sectional view taken along the lines 2—2 of FIG. 1.
Figure 3:
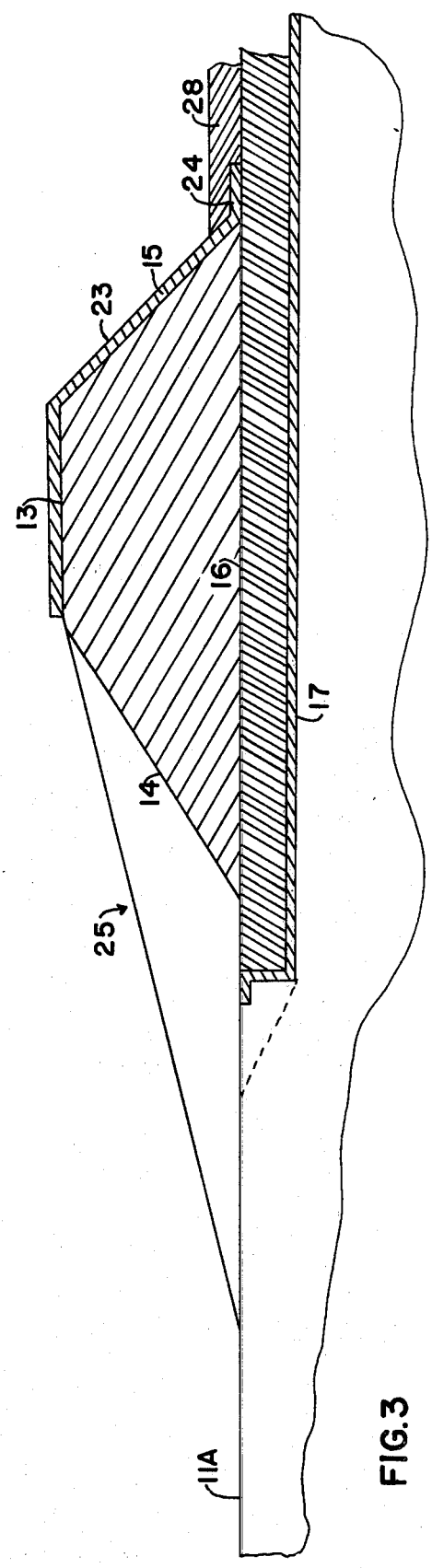
FIG. 3 is a cross-sectional view taken along the lines 3—3 of FIG. 1.

The bin 10 is established by initially establishing an excavation basin 17. The excavation basin 17 may be cut below the surface 11 as shown in FIGS. 2 and 3 or may be established on the existing surface 11 or may be established on an embankment above the existing surface 11. Preferably, where the local geology permits, the excavation basin will be cut below the existing surface 11 and the removed earth materials are reserved for construction of the periphery wall 12. Where the high water table level of the region does not permit, the selected site may be built-up with earth materials to a level which is preferably significantly above the high water table level in the region. The excavation basin has an elevated periphery and a surface which slopes along a water collection path. The excavation basin 17 extends outside the sloping outer periphery walls 14. Extending from the high side 11A toward the low side 11B along the central region of the excavation basin in a trench 18 which is below the adjacent level of the excavation basin 17 to a depth of 6 to 30 inches.

After the excavation basin 17 and drainage trench 18 are cut, a continuous film 19 of water-impervious material such as pre-formed film of water impervious plastic, for example, high-density polyethylene film, polypropylene film, polyvinyl fluoride film, polyvinyl chloride film, polyurethane elastomer film, other organic films such as polyethylene terephthalate film. The water-impervious film may be formed insitu by spraying asphaltic liquids to a sufficient thickness to establish a suitable water-impervious barrier. The thickness of film 19 should be sufficient to establish durability. For example, 6 mil thickness polyethylene film has been found to be acceptable.

The film 19 is carefully placed and is made continuous by adhesive seals, by appropriate folds, by fusion, by taping, etc. A drainage collection system including perforated pipes 20 is installed in the drainage ditch 18. Thereafter the drainage ditch 18 is covered with suitable water-permeable filler 21 such as broken rocks, tiles, shells, stones, gravel, sand and the like to surround the pipes 20.

The next step in constructing the permanent bin is the application of a water-impermeable cementitious covering 22. Preferably the water-impermeable cementitious covering 22 is formed from mixing portland cement with existing natural materials collected from the region 11, such as clay, gravel, sand and the like. The dry materials, portland cement and natural occurring materials, are mixed and allowed to cure in the presence of sufficient moisture until a hardened, water-impermeable monolithic covering 22 is developed on top of the continuous film 19. Other cementitious additives include hydraulic cements. Thereafter suitable natural occurring materials from the region 11 are placed around the perimeter of the covering 22 and are graded and shaped into the preferred trapezoidal cross-section. A coating 23 of water-impermeable material is applied as a continuous film over the interior sloping wall 15, over a contiguous annular portion 24 of the upper surface of the water-impermeable cementitious covering 22 and over at least a contiguous portion of the crest surface 13. Typically the water-impervious coating 23 is an asphaltic dispersion which dries to form a water-impervious film. The cementitious water-impermeable covering 22 may, of course, be formed from reinforced concrete with appropriate metal reinforcement to minimize cracking.

A suitable ramp 25 is provided at a selected location 26 along the periphery wall 12 by grading locally available natural materials from the region 11 to a ramp which has a grade suitable for hauling vehicles to reach the crest surface 13 at the location 26 for dumping waste materials into the bin 10.

DIMENSIONS

The size of the permanent bin depends upon the disposal requirements and their nature. In some installations, the temporary storage requirements may be limited to a few days, for example, over a week-end or holiday period when the permanent disposal facilities are not available. In other installations, the nature of the material may require accummulation for several months, e.g., where the particular waste can be effectively disposed of in large quantities. In other installations, the climate may restrict or preclude permanent disposal for several months of the calendar.

A typical bin for temporary storage has a length from the location 11A toward the location 11B of 50 feet and has a width of 20 feet. The exterior sloping walls 14 preferably have a slope rising 1 foot in 3 feet; the inner sloping walls 15 have a slope of about 45 degrees. The height of the periphery walls 12 above the cementitious covering 22 is from 5 to 15 feet. The water-impermeable cementitious covering 22 has a thickness of about 4 to 30 inches, preferably about 8 inches has been found to be satisfactory.

The drainage collection conduit 20 communicates with a monitoring sump 27 which is located outside the perimeter walls 12.

The permanent bin can be filled with non-volatile hazardous chemical substances which are deposited by vehicles from the ramp 25 into the interior of the bin. The hazardous materials can be moved about the interior of the bin by means of vehicles such as bulldozers or high lifts.

Most of the water accumulating within a bin 10 will evaporate harmlessly. Preferably the bin is covered with an appropriate tent, hood or tarpaulin to minimize the entry of atmospheric moisture into the bin. The bin 10 also may be enclosed by a roof and side-walls where circumstances require.

The drainage system including the drainage pipes 20 should not collect any drainage so long as the integrity of the collection system is maintained, i.e., there are no breaks in the cementitious covering 22.

In the event there is any drainage accumulating in the collection pipes 20, it will be stored in the monitoring sump 27 from which the identity of the drainage materials can be established, i.e., the concentrations of leachates in the drainage water can be precisely determined.

When the bin 10 has accumulated a sufficient quantity of bulk materials, the contents of the bin can be removed and delivered to a prepared site for permanent storage.

The permanent bin is intended for temporary storage of esentially non-volatile wastes in the form of solids and aqueous sludges, i.e., wastes which will not create atmosphereic pollution in the region of the bin. Liquid wastes should be concentrated prior to introduction into the bin. In a preferred embodiment, the cementitious covering 22 will be covered with a water-permeable layer 28 of local earth materials such as gravel, shale, sand, rocks or similar materials such as slag. The water-permeable layer 28 collects any atmospheric precipitation which may settle within the bin 10 and precludes extended immersion of the waste materials in stagnant water. The absorbed water can readily be evaporated from the layer 28 or, if required, can be pumped from the resevoir which is established by the supporting water-impermeable covering 22 for acceptable disposal. The preferred water-permeable layer 28 is from 6 to 12 inches thick.

We claim:

1. A storage bin for temporary storage of hazardous, non-volatile substances comprising:
   an excavation basin having an elevated periphery and a surface which slopes from said periphery along a collection path;
   a water-impervious liner for said basin comprising a water-impervious film;
   a water-impermeable covering for said liner comprising a monolithic layer of hardened cementitious material;
   a perimeter wall above and inside the rim of said water-impervious covering;
   said perimeter wall having a crest, an annular sloping outer surface and an annular sloping inner surface;
   a liquid-impervious coating over said annular sloping inner surface and over a continguous annular margin of the said water-impermeable covering;
   a monitoring drain comprising a collector conduit along the central region of said excavation basin beneath the said water-impermeable covering and above the said film;
   a collection sump located outside said perimeter wall;
   said collector conduit communicating with said collecting sump;
   said excavation basin being above the high water table level of the region.

2. The storage bin of claim 1 including an access ramp sloping outwardly from a selected location of the said crest.

3. The storage bin of claim 1 wherein the said liquid-impermeable coating is applied as a continuous surface over the said margin, entire surface of said annular sloping inner surface and over a contiguous portion of said crest.

4. The storage bin of claim 1 wherein the said water impervious liner is a preformed film of water-impervious plastic.

5. The storage bin of claim 4 wherein the said performed film is polyethylene film.

6. The storage bin of claim 1 wherein the said water-impermeable covering is formed by mixing a cementitious additive with locally available earth materials.

7. The storage bin of claim 1 wherein a water-permeable layer of locally available earth material is applied on top of the said water-impermeable covering.

* * * * *